United States Patent [19]

Ukai et al.

[11] Patent Number: 4,607,003

[45] Date of Patent: Aug. 19, 1986

[54] PHOTOGRAPHIC ELEMENT

[75] Inventors: Toshinao Ukai; Tadahisa Sato; Toshio Kawagishi; Haruo Takei, all of Kanagawa, Japan

[73] Assignee: Fuji Photo Film Co., Ltd., Kanagawa, Japan

[21] Appl. No.: 721,519

[22] Filed: Apr. 9, 1985

[30] Foreign Application Priority Data

Apr. 9, 1984 [JP] Japan .................... 57-70513

[51] Int. Cl.$^4$ .................... G03C 1/84; G03C 1/24; G03C 1/14
[52] U.S. Cl. .................... 430/519; 430/522; 430/570; 430/580; 430/587; 430/593; 430/595
[58] Field of Search ............ 430/587, 593, 519, 522, 430/580, 595, 570

[56] References Cited

U.S. PATENT DOCUMENTS

| | | | |
|---|---|---|---|
| 2,887,480 | 5/1959 | Webster et al. | 430/587 |
| 3,337,540 | 8/1967 | Libeer et al. | 430/587 |
| 3,758,309 | 9/1973 | Bailey et al. | 430/593 |
| 3,936,308 | 2/1976 | Gaugh et al. | 430/587 |

FOREIGN PATENT DOCUMENTS 43947 12/1971 Japan .................... 430/587

OTHER PUBLICATIONS

Defensive Publication, T903,026, published Oct. 3, 1972.

Primary Examiner—Mary F. Downey
Attorney, Agent, or Firm—Sughrue, Mion, Zinn, Macpeak, and Seas

[57] ABSTRACT

A photographic element comprising a support and at least one silver halide emulsion layer. The photographic element contains at least one layer containing at least one of the dyes represented by the following formula (I), (II), (III), (IV), (V), (VI), (VII) or (VIII):

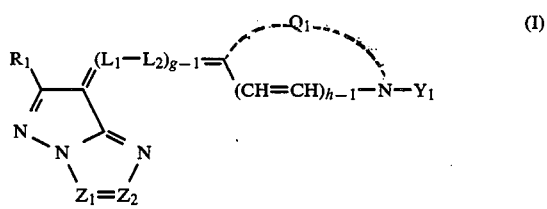

(I)

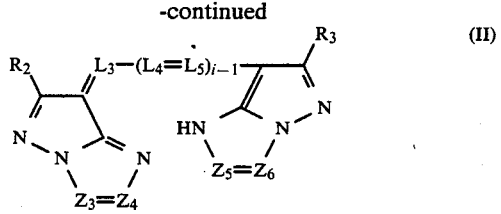

(II)

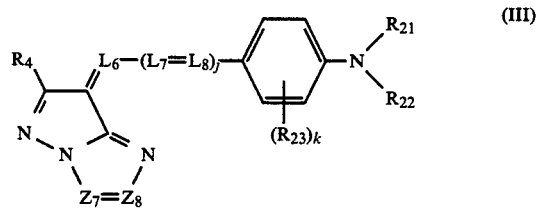

(III)

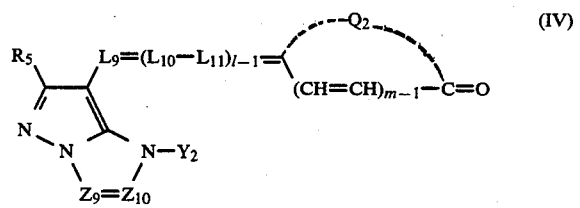

(IV)

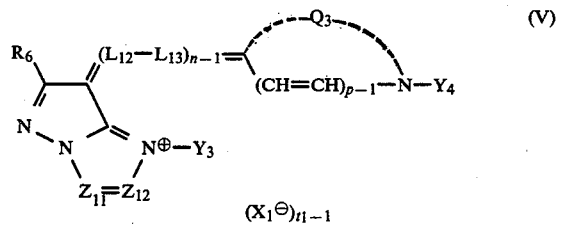

(V)

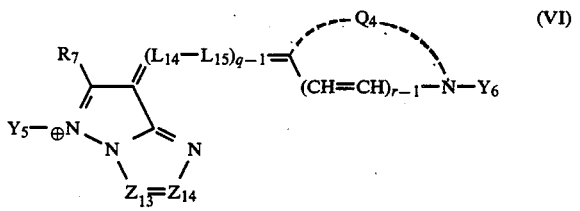

(VI)

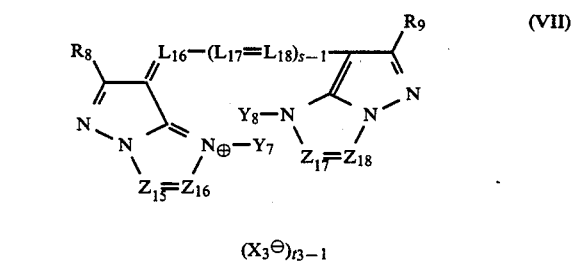

(VII)

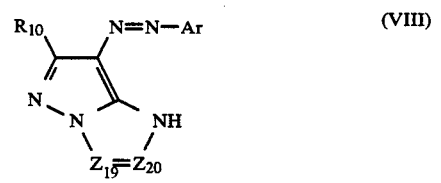

(VIII)

wherein $Z_1$ to $Z_{10}$; $R_1$ to $R_{24}$; $L_1$ to $L_{18}$; $Y_1$ to $Y_8$; $Q_1$ to $Q_4$; $X_1$ to $X_3$; Ar; h, m, p and r; and $t_1$ to $t_3$ are described in the specification.

13 Claims, No Drawings

PHOTOGRAPHIC ELEMENT

BACKGROUND OF THE INVENTION

This invention relates to a light-sensitive photographic element containing a colored compound produced from a 1H-imidazo[1,2-b]pyrazole, 1H-pyrazolo-[1,5-b][1,2,4]-triazole or 1H-pyrazolo[1,5-d]tetrazole derivative.

1H-imidazo[1,2-b]pyrazole, 1H-pyrazolo[1,5-b][1,2,4]triazole and 1H-pyrazolo[1,5-d]tetrazole derivatives are heterocyclic compounds, and Japanese Patent Application Nos. 23434/1983, 45512/1983 and 14201/1983 disclose that these compounds have superior properties as magenta couplers for color photography. Various extensive investigations made by the present inventors have now led to the discovery that dyes useful for silver halide photograhic materials can be obtained from these heterocyclic derivatives.

Dyes in accordance with this invention synthesized from 1H-imidazo[1,2-b]pyrazole, 1H-pyrazolo-[1,5-b][1,2,4]triazole and 1H-pyrazolo[1,5-d]tetrazole derivatives have many uses, for example photographic sensitizers, photographic sensitizing dyes, dyes for photographic filters and anti-halation dyes.

SUMMARY OF THE INVENTION

It is an object of this invention to provide novel dyes synthesized from 1H-pyrazolo[1,5-b]imidazole, 1H-pyrazolo[1,5-b][1,2,4]triazole and 1H-pyrazolo[1,5-d]-tetrazole derivatives.

Another object of this invention is to provide a photographic element employing the novel dyes having improved sensitivity.

The above objects of this invention are preferably achieved by a photographic element comprising a support and at least one silver halide emulsion layer, the photographic element containing at least one layer containing at least one of the dyes represented by the following general formulae (I) to (VIII)

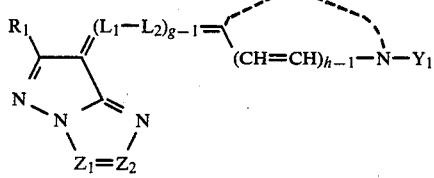

(I)

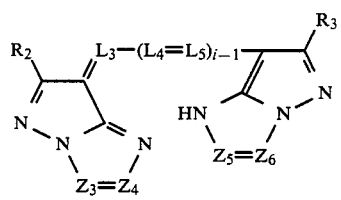

(II)

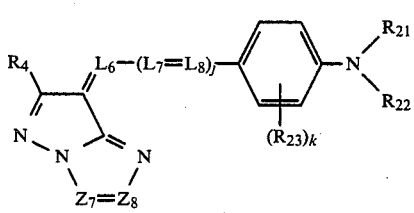

(III)

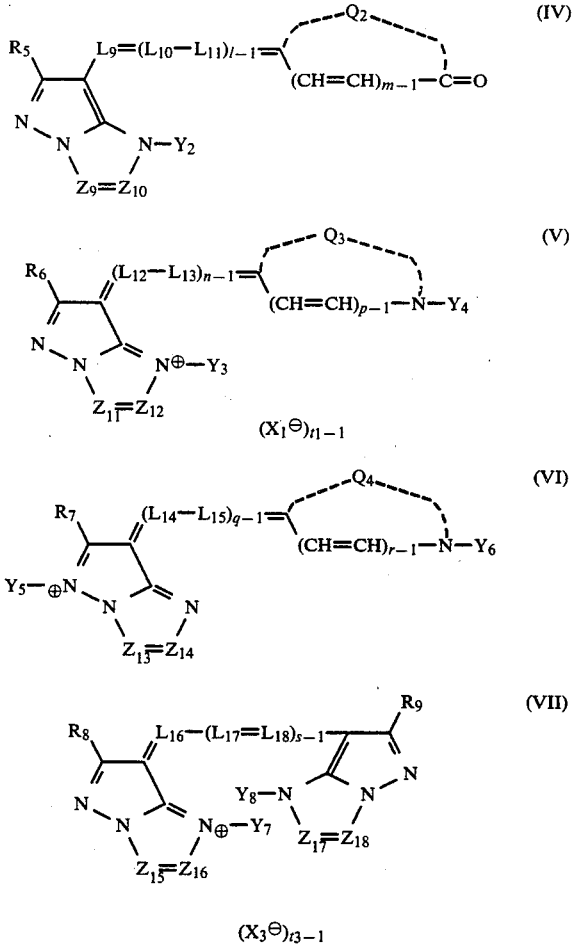

wherein
$Z_1$ to $Z_{20}$ are identical or different and each represents a nitrogen atom or the group $$-\overset{R_{24}}{\underset{|}{C}}=$$

$R_1$ to $R_{10}$ and $R_{24}$ are identical or different, and each represents a hydrogen atom, an alkyl group, an aryl group, a heterocyclic group, an amino group, an acylamino group, an alkoxy group, an alkoxycarbonyl group, a sulfonamide group, an aminocarbonyl group, a hydroxyl group or a carboxyl group, and the alkyl, aryl, heterocylic, amino, sulfonamide and aminocarbonyl groups may have one or more substituents, $L_1$ to $L_{18}$ each represent a methine group or a substituted methine group, $Y_1$ and $Y_3$ to $Y_8$ each represent a substituted or unsubstituted alkyl group or a substituted or unsubstituted alkylene group, $Y_2$ represents a hydrogen atom, an alkyl group or a substituted alkyl group, $R_{21}$ and $R_{22}$ each represents a hydrogen atom, an alkyl group, a substituted alkyl group, an aryl group or a substituted aryl group, $R_{23}$ represents a hydrogen atom, a halogen atom, an alkyl group, a substituted alkyl group, an alkoxy group, an aryl group or a substituted aryl group, $Q_1$ to $Q_4$ each represents a nonmetallic atomic grouping required to form a heterocyclic 5- or 6-membered ring to which an aromatic ring may be fused, $X_1$ to $X_3$ each represents an acid residue, Ar represents an aromatic ring or a heteroaromatic ring, g, i, j, k, l, n, q and s each represents an integer of 1 to 4, h, m, p and r each represents an integer of 1 or 2, and $t_1$ to $t_3$ each represents an integer of 1 or 2, and when the dye forms an intramolecular salt, $t_1$ to $t_3$ represent 1.

DETAILED DESCRIPTION OF THE INVENTION

The photographic element of this invention contains at least one layer containing at least one dye compound represented by the following formula

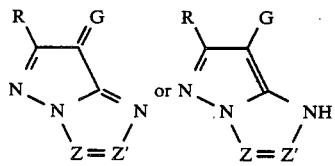

wherein

Z and Z' are identical or different and each represents a methine group, a substituted methine group or a nitrogen atom, and R represents a hydrogen atom, an alkyl group, an aryl group, a heterocyclic group, an amino group, an acylamino group, a sulfonamide group, an alkoxy group, an alkoxycarbonyl group, an aminocarbonyl group, a hydroxyl group or a carboxyl group, and the alkyl, aryl, heterocyclic, sulfonamide and aminocarbonyl groups may have a substituent.

G represents a nonmetallic atomic grouping required to complete a color forming system.

Further, G represents a group comprising an aromatic cyclic group and an azo group or a substituted or nonsubstituted methylene group by which the aromatic cyclic group links to the pyrazoloazole ring, sometimes by a conjugated double bond. The aromatic cyclic group includes one showing aromatic property of $(4n+2) \pi$ system (n is 0 or integer) derived from electons on hetero atoms in addition to $\pi$—electrons between carbon—carbon bond.

In the above formulae (I), and (V) and (VI), the substituents $Q_1$, $Q_3$ and $Q_4$ preferably repesent a nonmetallic atomic grouping required to complete heterocyclic rings conventionally used in cyanine dyes, such as indolenine, benzothiazole, benzoxazole, benzoselenazole, benzimidazole, quinoline, pyridine and isoquinoline. Substituent $Q_2$ in formula (IV) represents an atomic grouping required to complete heterocyclic ketomethylene rings conventionally used in merocyanine dyes, such as hydantoin, thiohydantoin, rhodanine, barbituric acid, thiobarbituric acid, 2-thiazolidin-4-one, 2- thio-2, 4-oxazolidinedione, 2-imidazolin-4-one, 2-pyrazolin-5-one and indandione.

Preferred dyes of general formula (I) to (VIII) are those in which a combination of ($Z_1$ and $Z_2$), ($Z_3$ and $Z_4$), ($Z_5$ and $Z_6$), ($Z_7$ and $Z_8$), ($Z_9$ and $Z_{10}$), ($Z_{11}$ and $Z_{12}$), ($Z_{13}$ and $Z_{14}$), ($Z_{15}$ and $Z_{16}$), ($Z_{17}$ and $Z_{18}$) or ($Z_{19}$ and $Z_{20}$) is (1) a combination of

groups ($R_{24}$ moieties may be different), (2) a combination of nitrogen atom and

or (3) a combination of nitrogen atoms. Among the above combinations, the combinations (1) and (2) are especially preferred.

Preferred examples of the substituents $R_1$ to $R_{10}$ and $R_{24}$ are a hydrogen atom, alkyl groups (linear or branched alkyl groups) having 1 to 33 carbon atoms (such as methyl, ethyl, isopropyl, n-butyl, n-octyl and n-undecanyl); substituted alkyl groups (including benzyl, phenethyl and 3-phenyl-propyl) having 1 to 33 carbon atoms; aryl groups having 6 to 14 carbon atoms (such as phenyl, naphthyl anthracenyl, etc); heterocyclic groups having 5 to 10 carbon atoms (such as prydyl, quinolyl, etc); acylamino groups having 1 to 22 carbon atoms (such as acetylamino, propionylamino, benzoylamino, etc); alkoxyl groups having 1 to 22 carbon atoms (such as methoxy, ethoxy, propoxy, hexyloxy, cyclohexyloxy, etc); sulfonamide groups having 1 to 22 carbon atoms (such as methanesulfonamide, ethanesulfonamide, p-toluenesulfonamide, etc); aminocarbonyl groups having 1 to 22 carbon atoms (such as dimethylaminocarbonyl, cyclohexylaminocarbonyl, phenylaminocarbonyl, pyridylaminocarbonyl, ets). Substituent for the above alkyl, aryl, heterocyclic, amino, sulfonamide and aminocarbonyl groups includes typically halogen atom, alkyl, alkoxyl, aryl, alkoxycarbonyl, cyano, hydroxyl, carboxyl, etc, those groups having at most 22 carbon atoms.

Preferred examples of the substituents $R_{21}$ and $R_{22}$ are a hydrogen atom; alkyl groups having 1 to 12 carbon atoms (such as methyl, ethyl, propyl, butyl, octyl, etc); aryl groups having 6 to 14 carbon atoms (such as phenyl, naphthyl, anthracenyl, etc).

Preferred substituent $R_{23}$ is a hydrogen atom; a halogen atom (such as fluoro, chloro bromo, etc); alkyl groups having 1 to 22 carbon atoms and alkoxyl groups having 1 to 22 carbon atoms, and $R_{23}$ and $R_{21}$ or $R_{22}$ may link together to form a cyclic structure.

Preferred anions $X_1$ to $X_3$ are acid residues and preferably, halogen ions (such as chloro, fluoro, bromo, iodo); perchlorate ion; tetrafluoroborate ion; hexafluorophosphate ion, alkyl or aryl sulfonate ions (such as tosylate, methyl sulfonate, ethyl sulfonate, etc) etc.

Preferred substituent Ar includes aromatic groups (such as phenyl, 2,5-dimethoxyphenyl, 4-methoxy phenyl, 4-morpholino-2,5-dibutoxy phenyl, 4-chlorophenyl, naphthyl, etc.,) and heteroaromatic groups (such as pyridyl, etc.,).

When the methine group represented by $L_1$ to $L_{18}$ is substituted, the prefered substituents are lower alkyl groups having 1 to 6 carbon atoms (such as methyl, ethyl, propyl butyl, hexyl, etc); a phenyl group and aralkyl groups having 7 to 12 carbon atoms (such as benzyl, phenethyl, 3-phenylpropyl, 4-phenylbutyl, naphthylethyl, etc,).

Preferred substituents $Y_1$ and $Y_3$ to $Y_8$ include alkyl groups having 1 to 4 carbon atoms and alkyl groups having 2 to 4 carbon atoms which are substituted by a sulfo group, a carboxyl group or a hydroxyl group. The alkyl moiety may further be substituted by methyl, chloro or hydroxyl group.

Preferred substituent $Y_2$ is a hydrogen atom and alkyl groups having 1 to 4 carbon atoms.

Specific examples of the compounds represented by general formulae (I) to (VIII) are listed below without any intention of limiting the invention thereto.

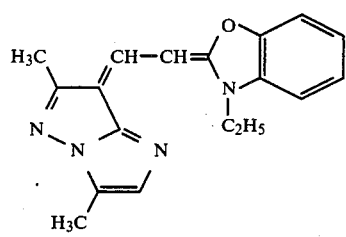
(1)

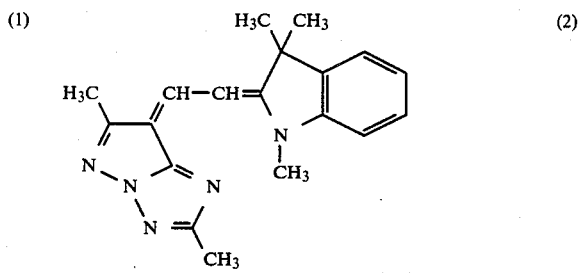
(2)

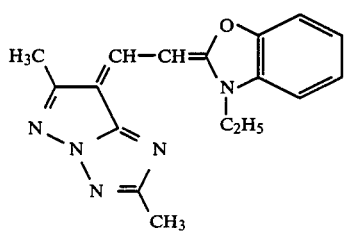
(3)

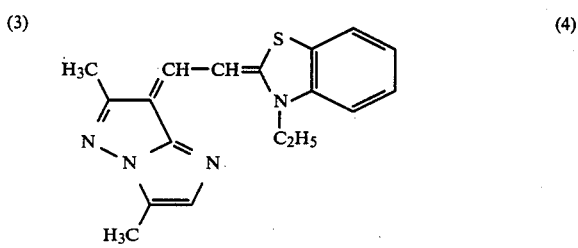
(4)

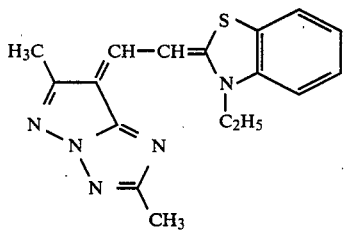
(5)

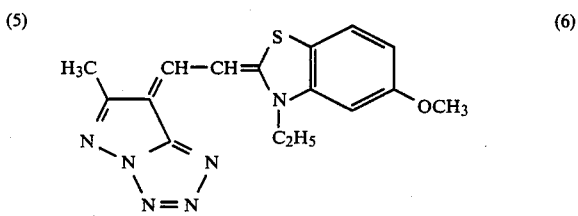
(6)

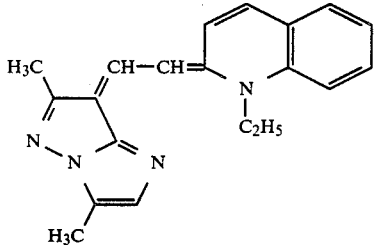
(7)

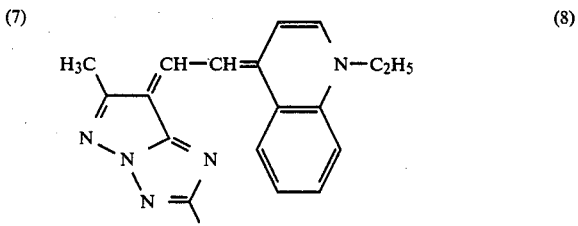
(8)

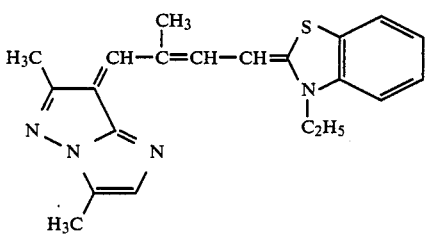
(9)

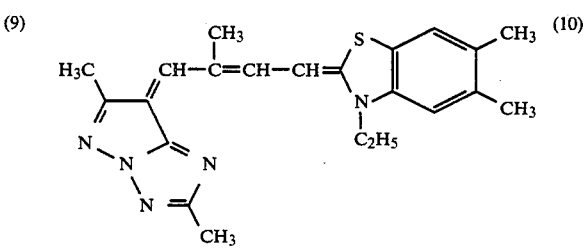
(10)

-continued
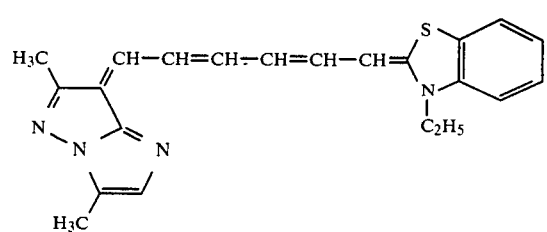 (11) 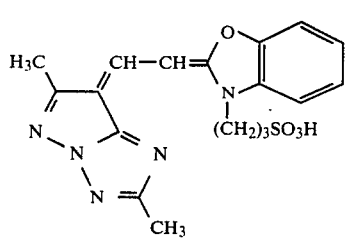 (12)
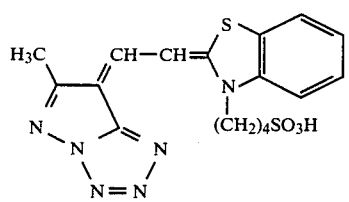 (13) 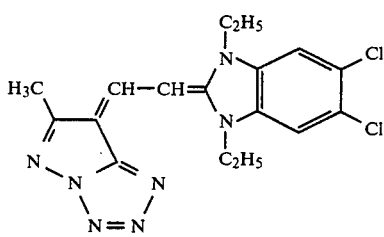 (14)
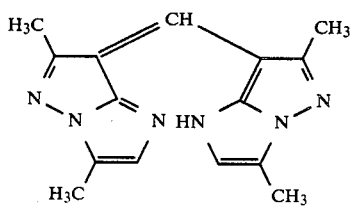 (15) 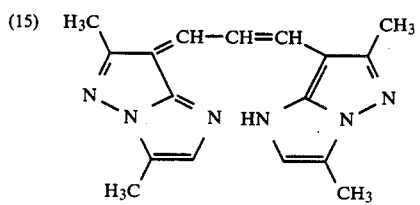 (16)
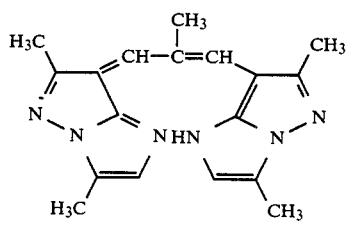 (17) 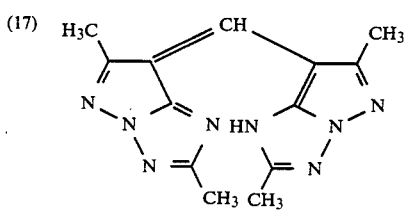 (18)
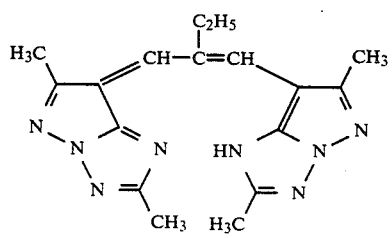 (19) 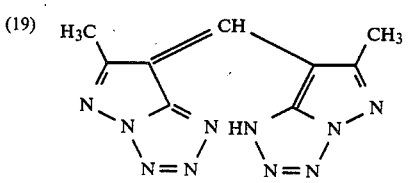 (20)
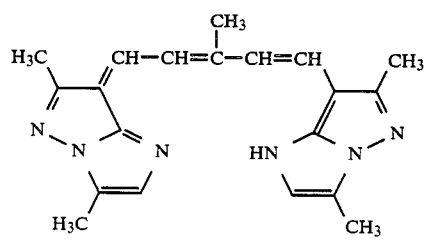 (21) 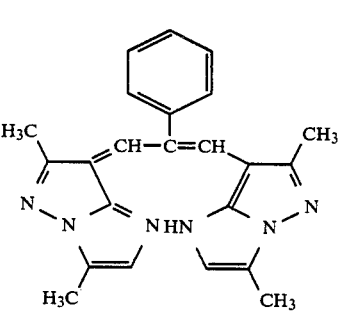 (22)

-continued
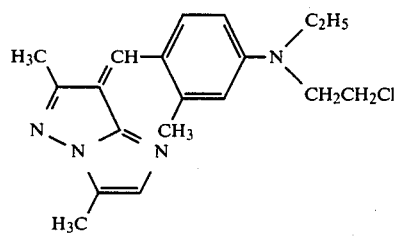   (23)
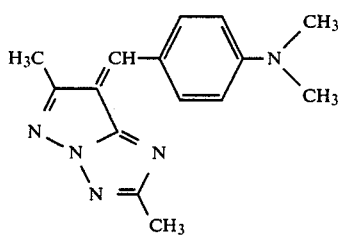   (24)
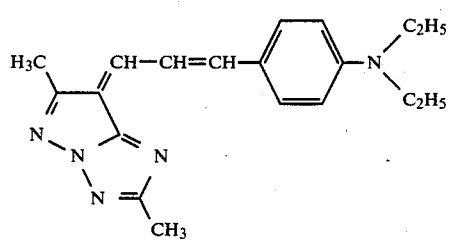   (25)
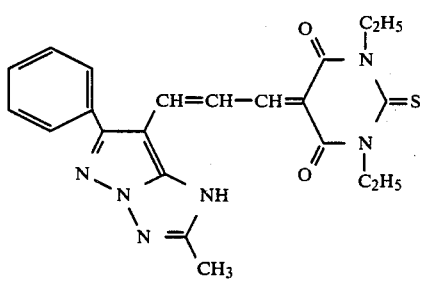   (26)
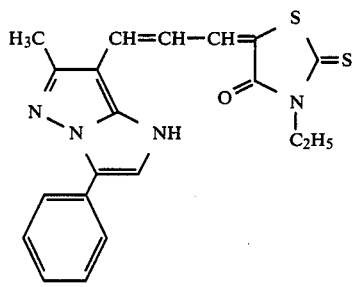   (27)
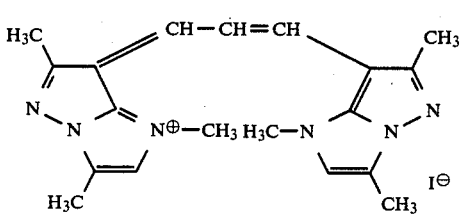   (28)
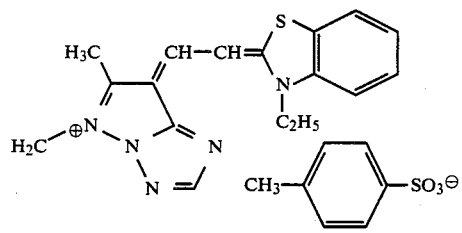   (29)
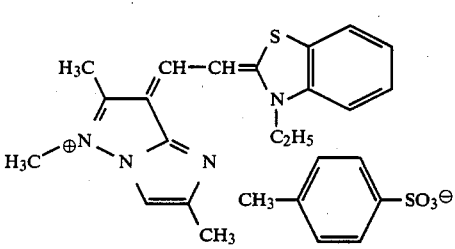   (30)
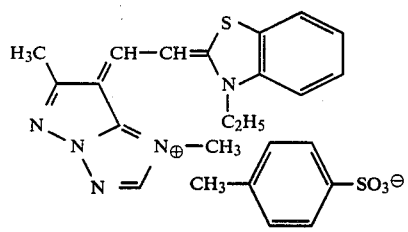   (31)
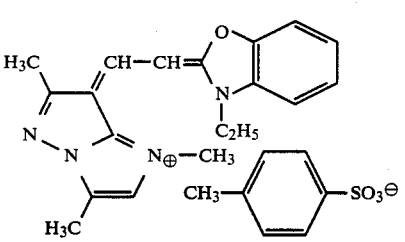   (32)
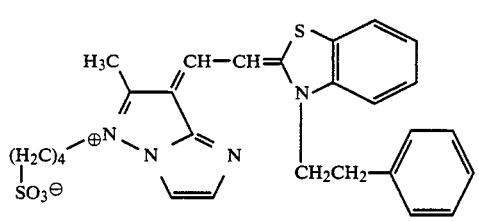   (33)
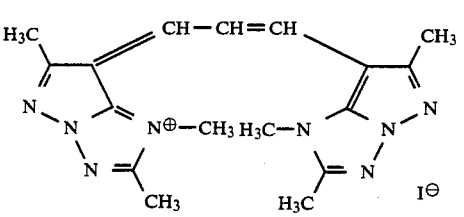   (34)

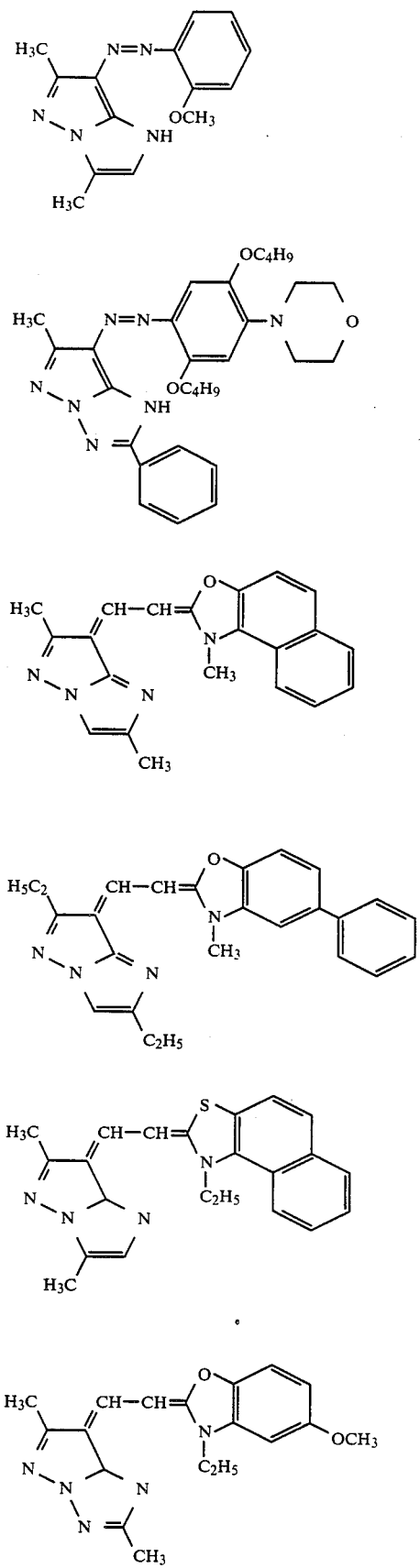
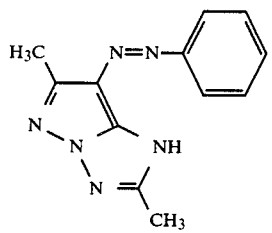
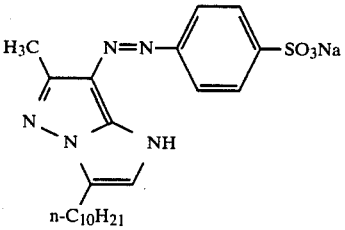
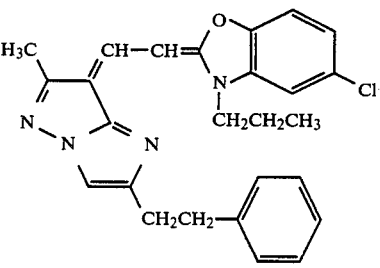
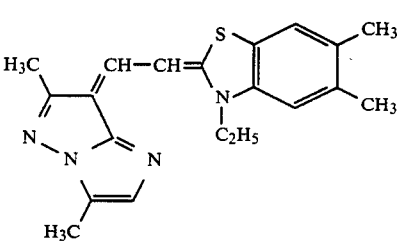
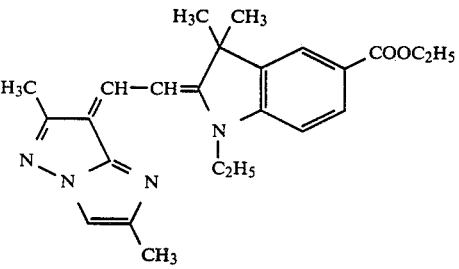
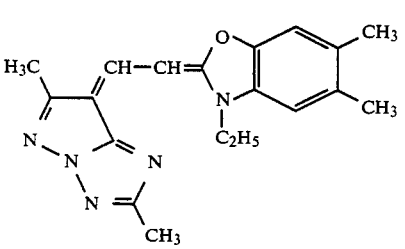

-continued
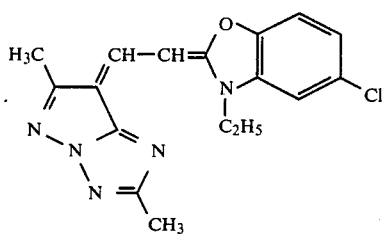
(47)
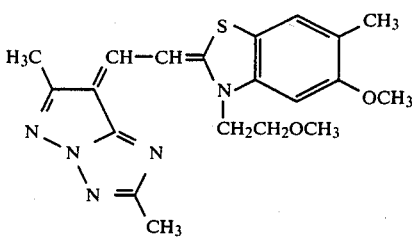
(48)
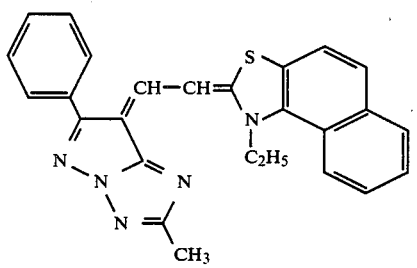
(49)
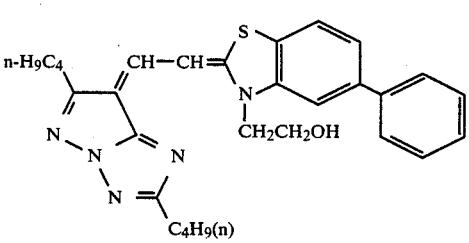
(50)
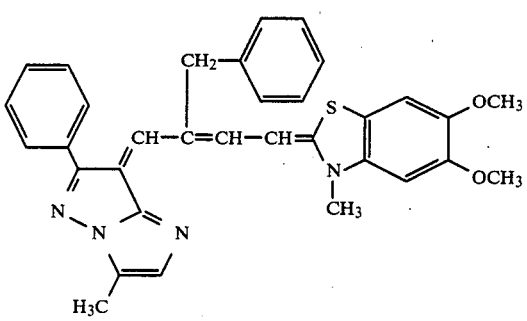
(51)
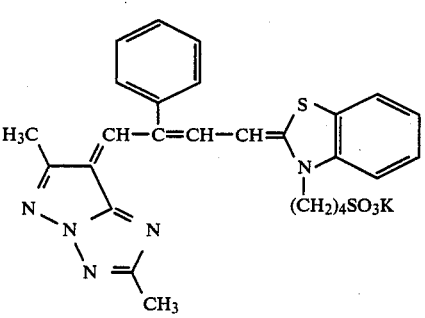
(52)
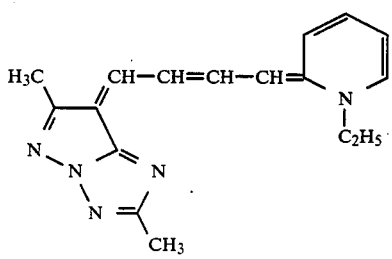
(53)
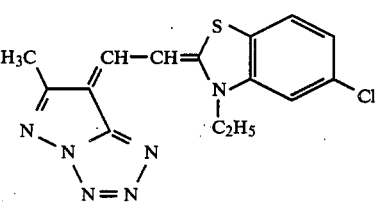
(54)
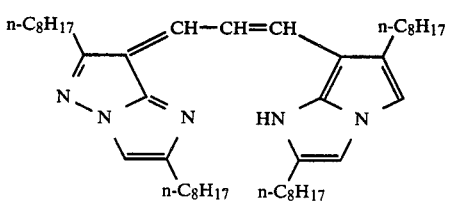
(55)
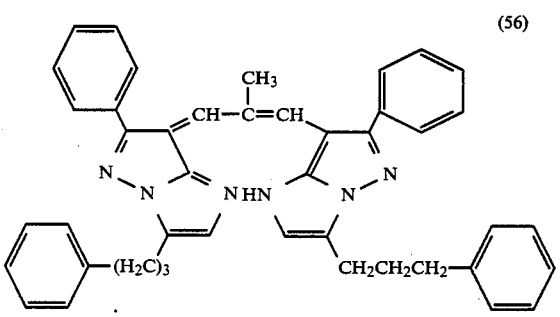
(56)

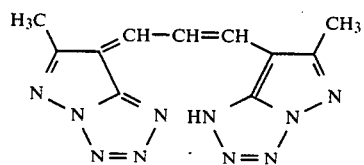 (57)
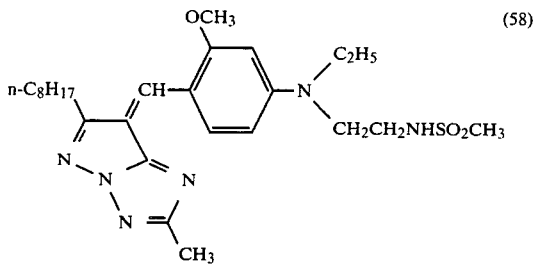 (58)
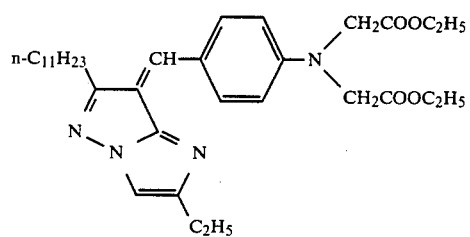 (59)
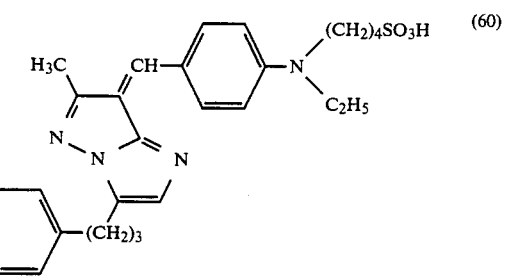 (60)
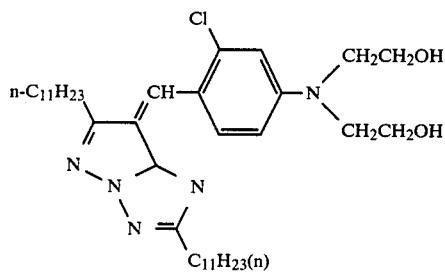 (61)
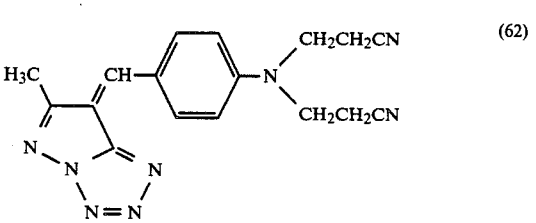 (62)
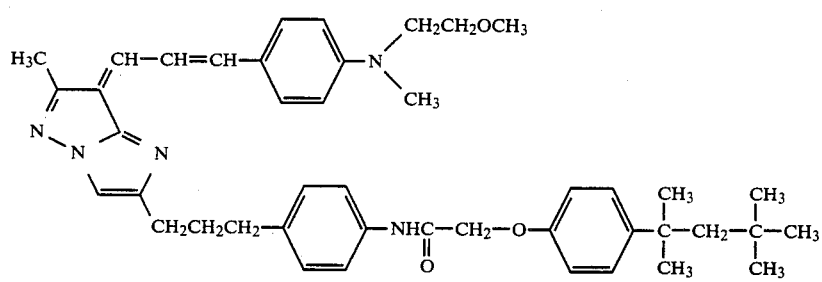 (63)
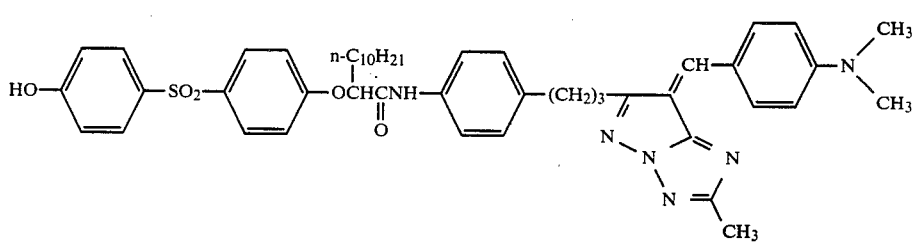 (64)
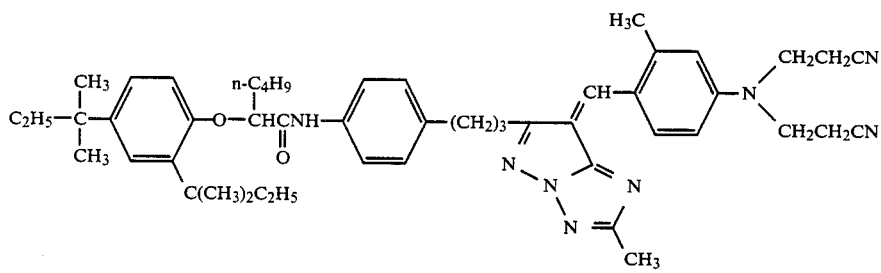 (65)

-continued

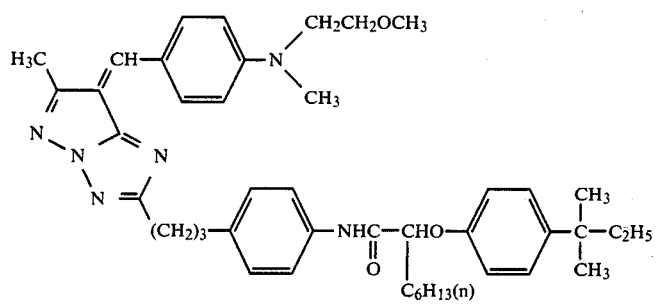
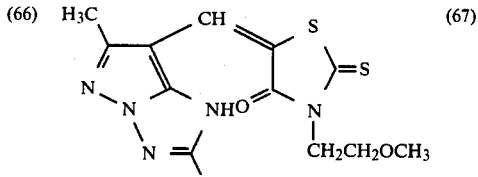

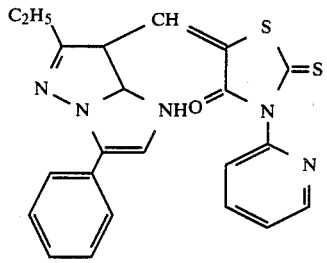
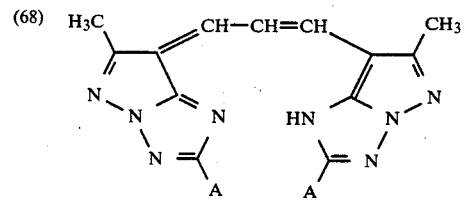

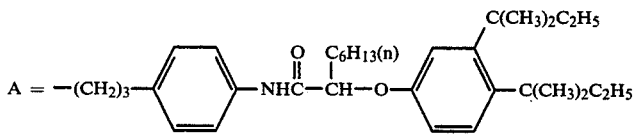

The dyes in accordance with this invention can be produced by first synthesizing the 1H-imidazo[1,2-b]pyrazole, 1H-pyrazolo[1,5-b][1,2,4]triazole or 1H-pyrazolo[1,5-d]tetrazole derivatives by the methods described in Japanese Patent Application Nos. 22434/1983, 45512/1983 and 142801/1983, and treating the resulting products by known methods. Specific procedures are illustrated in the Examples given hereinbelow.

When the dyes of general formulae (I) to (VIII), particularly dyes containing an amidinium ion represented by general formulae (V), (VI) and (VII), are used as sensitizers or sensitizing dyes for emulsions containing couplers, the charge of the dye chromophore is preferably negative or netural. For this purpose, they are preferably anionic or betaine-type dyes in which $Y_3$ to $Y_8$ are lower alkyl groups substituted by a sulfonato, carboxyl or hydroxyl group. Furthermore, when the cationic dyes in accordance with this invention are used as sensitizing dyes, it is advisable to decrease the amount of oil, i.e. a high-boiling organic solvent, used in dispersing a coupler in order to prevent desorption of the dye by the oil.

The dyes in accordance with this invention represented by general formulae (I) to (VII) are preferred as sensitizers or sensitizing dyes for silver halide emulsions and particularly important, the dyes of general formulae (I) to (VII) in which the partial structure of azapentalene is imidazo [1,2-b]pyrazole or pyrazolo [1,5-b][1,2,4]triazole have superior properties as sensitizing dyes for photography and are especially preferred.

When the dyes of general formulae (I) to (VIII) are added to a silver halide emulsion layer as a sensitizing agent or sensitizing dye (to be inclusively referred to as a sensitizing dye), they are used in an amount of $5 \times 10^{-7}$ to $5 \times 10^{-3}$ mole, preferably $5 \times 10^{-6}$ to $2 \times 10^{-3}$ mole, per mole of silver halide. The optimal amount of the dyes depends upon the chemical structures of the sensitizing dyes used, and the crystal habit and particle size of the silver halide emulsion. These sensitizing dyes may be added at any stage of the preparation of the silver halide emulsion, for example charging, pre-ripening or after-ripening. Or they may be added to the coating solution before coating. Also both of these methods may be used in combination.

When the dyes of general formulae (I) to (VIII) are used as irradiation preventing dyes or antihalation dyes, they may be used in arbitrary amounts that produce the desired effect. Preferably, their amounts are such that the optical density falls within the range of 0.05 to 3.0. They may be added at any stage before coating.

The dye used in this invention may be directly dispersed in the emulsion. It may be added to the emulsion in the form of a solution in a suitable solvent such as methyl alcohol, ethyl alcohol, propyl alcohol, methyl Cellosolve, the halogenated alcohols described in Japanese Laid-Open Patent Publication No. 9715/1973, acetone, water and pyridine or mixtures thereof. There can also be used the methods of addition described in Japanese Patent Publication No. 24185/1971, and U.S. Pat. Nos. 3,822,135, 3,660,101, 2,912,343, 2,996,287, 3,429,835, and 3,658,546. The method described in German Patent Application No. 2,104,283 and the method described in U.S. Pat. No. 3,649,286 can also be used.

Any of the silver bromide, silver iodobromide, silver iodochlorobromide, silver chlorobromide and silver chloride can be used as the silver halide emulsion in this invention. Preferred silver halides are silver bromide, silver chlorobromide, silver iodobromide and silver iodochlorobromide.

The silver halide grains in the photographic emulsion may be regularly-shaped crystals such as cubic or octagonal crystals, or irregularly-shaped crystals such as spherical or platelike crystals, or may have a crystal form of a combination of these regular and irregular shapes. Or they may be composed of mixtures of grains having various crystal shapes.

The inner and surface layers of the silver halide grains may be different or may consist of a uniform phase. Furthermore, they may be those particles on which a latent image is formed mainly on the surface (such as a negative emulsion), or particles in which a latent image is formed mainly in the interior (such as an internal latent image-type emulsions or a pre-fogged direct reversal-type emulsion).

The silver halide emulsions used in the present invention are preferably composed of flat plat-like particles in which particles having a thickness of not more than 0.5 micron, preferably not more than 0.3 micron, a diameter of preferably at least 0.6 micron and an average aspect ratio of at least 5 accounts for at least 50% of the total projection area. Or they may be disperse emulsions in which the number of particles having a particle size within ±40% of the average particle diameter is at least 95% of the total number of the particles.

Silver halide emulsions having the aforesaid various halogen compositions, crystal habits, and internal structures, shapes and distributions of the grains have various uses in photographic elements. Accordingly, the dyes in accordance with this invention can be used together with emulsions used in the following applications: sensitizers, sensitizing dyes, filter dyes, antihalation dyes irradiation preventing dyes, etc. These dyes may also be added to other desired layers such as an interlayer, a protective layer or a backing layer.

The dyes in accordance with this invention are used together with silver halide photographic emulsions of various color and black-and-white photographic materials.

More specifically, they may be used together with emulsions for color positives, emulsions for color papers, emulsions for color negatives, color reversal emulsions (which may, or may not, contain couplers), emulsions for platemaking photographic materials (such as a lithographic film or a lithographic films for duplication purposes), emulsions used in photograhic materials for display on a cathode ray tube, emulsions used in X-ray recording photographic materials (particularly direct or indirect photographic materials using a screen), emulsions used in the colloid transfer process (described, for example, in U.S. Pat. No. 2,716,059), emulsions used in the silver salt diffusion transfer process (described, for example, in U.S. Pat. Nos. 2,352,014, 2,543,181, 3,020,155 and 2,861,885), emulsions used in the color diffusion transfer process (described, for example, in U.S. Pat. Nos. 3,087,817, 3,185,567, 2,983,606, 3,253,915, 3,227,550, 3,227,551, 3,227,552, 3,415,644, 3,415,645, and 3,415,646), emulsions used in a dye transfer process (the inhibition transfer process) (described, for example, in U.S. Pat. No. 2,882,156), emulsions used in a silver color bleaching process (described, for example, in Friedman, "History of Color Photography", American Photographic Publishers Co., 1944, particularly Chapter 24, and British Journal of Photography, Vol. 111, p. 308-309, Apr. 7, 1964), emulsions used in materials for recording print-out images (described, for example, in U.S. Pat. No. 2,369,449 and Belgian Pat. No. 704,976), emulsions used in direct print image photograhic materials (described, for example, in U.S. Pat. Nos. 3,033,682 and 3,287,137), emulsions used in thermo developable photographic materials (described, for example, in U.S. Pat. Nos. 3,152,904, 3,312,550 and 3,148,122, and British Pat. No. 1,110,046), and emulsions used in photograhic materials for physical development (described, for example, in British Pat. Nos. 920,277 and 1,131,238).

The photographic emulsions used in this invention can be prepared by the methods described, for example, in P. Glafkides "Chimie et Physique Photographique" (published by Paul Mondel, 1967), G. F. Duffin, "Photographic Emulsion Chemistry" (published by The Focal Press, 1966), and V. L. Zelikman et al., "Making and Coating Photograhic Emulsion "(published by The Focal Press, 1964). In other words, they may be prepared by any of the acidic method, neutral method and ammonia method. Soluble silver salts may be reacted with soluble halogen salts by a single jet method, a double jet method, or a combination of these.

There can be used a method in which grains are formed in the presence of an excess of a silver ion. As one type of simultaneously mixing method, a method wherein the pAg in the liquid phase in which the silver halide is formed is maintained constant, namely the so-called controlled double jet method, can be used.

This method can give a silver halide emulsion in which the grains have a regular crystal form and a neatly uniform size.

Two or more silver halide emulsions separately prepared may be used as a mixture.

In the formation of silver halide grains, the growth of the grains may be controlled by using a solvent for the silver halide, such as ammonia, potassium thiocyanate, ammonium thiocyanate, thioether compounds (for example, those described in U.S. Pat Nos. 3,271,157, 3,574,628, 3,704,130, 4,297,439, and 4,276,374), thione compounds (described, for example, in Japanese Laid-Open Patent Publications Nos. 144,319/1978, 82,408/1978, and 77,737/1980), and amine compounds (described, for example, in Japanese Laid-Open Patent Publication No. 100,717/1979).

Formation or physical ripening of the silver halide grains may be carried out in the presence of a cadmium salt, a zinc salt, a thallium salt, an iridium salt or its complex, a rhodium salt or its complex, or an iron salt or its complex.

Examples of the internal latent image type emulsions used in this invention include conversion-type emulsions, core-shell type emulsions and emulsions including heteromethallicatoms which are described, for example, in U.S. Pat. Nos. 2,592,250, 3,206,313, 3,447,927, 3,761,276 and 3,935,014.

Usually, the silver halide emulsions are chemically sensitized. For the chemical sensitization, the methods described at pages 675 to 734 of Die Grundlagen der Photographischen Prozesse mit Silberhalogenidn (edited by H. Frieser, Akademische Verlagsgesellschaft, 1968) may, for example, be used. Specifically, there can be used a sulfur sensitization method using compounds containing sulfur capable of reacting with silver or active gelatin (such as thiosulfates, thioureas, mercapto compounds, and rhodanines), a reduction sensitization method using reducible substances (such as stannous salts, amines hydrazine derivatives, formamidinesulfinic acid, and silane compounds), and a gold sensitizing method using noble metal compounds (such as metal complex salts, and complex salts of metals of Group VIII of the periodic table such as Pt, Ir and Pd) either singly or in combination.

Various compounds may be incorporated in the photographic emulsions used in this invention in order to prevent fogging during the production, storage or processing of photographic materials or to stabilize the photographic properties of the photographic materials. They include many compounds known as antifoggants or stabilizers, for example azoles such as benzothiazolium salts, nitroindazoles, triazoles, benzotriazoles and benzimidazoles (particularly nitro- or halogen-substituted benzimidazoles); heterocyclic mercapto compounds such as mercaptothiazoles, mercaptobenzothiazoles, mercaptobenzimidazoles, mercaptothiaziazoles, mercaptotetrazoles (particularly 1-phenyl-5-mercaptotetrazole) and mercaptopyrimidines; the aforesaid heterocyclic mercapto compounds having water-soluble groups such as a carboxyl or sulfone group; thioketo compounds such as oxazolinethione; azaindenes such as tetrazaindenes [particularly 4-hydroxy-substituted (1,3,3a,7)tetrazaindenes]; benzenethiosulfonic acids; and benzenesulfinic acid.

The silver halide photographic emulsions used in this invention may contain compounds which disperse couplers and color couplers such as cyan couplers, magenta couplers and yellow couplers.

Specifically, they may contain compounds which form colors by oxidative coupling with aromatic primary amine developing agents (such as phenylnediamine derivatives or aminophenol derivatives) in color development. The magenta couplers may include 5-pyrazolone couplers, pyrazolobenziimidazole couplers, cyanoacetylcoumarone couplers, and open-chain acyl acetonitrile couplers. The yellow couplers may include acylacetamide couplers (such as benzoyl acetanilides, and pivaloyl acetanilides). The cyan couplers may include naphthol couplers and phenol couplers. Desirably, these couplers contain hydrophobic groups called ballast groups in the molecule and are non-diffusible. The couplers may be 4 equivalents or 2 equivalents to the silver ion. They may also be colored couplers having the effect of color correction, or couplers capable of releasing a development inhibitor during development (so-called DIR couplers).

They may also include colorless DIR coupling compounds whose products of coupling reactions are colorless and which release a development inhibitor.

The photographic emulsions used in this invention may contan polyalkylene oxides and derivatives thereof such as the ethers, esters and amines, thioether compounds, thiomorpholine compounds, quaternary ammonium salts, urethane derivatives, urea derivatives, imidazole derivatives, and 3-pyrazolidones for the purpose of increasing sensitivity and contract or accelerating development.

The photographic emulsions used in this invention may further contain known water-soluble dyes such as oxonol dyes, hemioxonol dyes and merocyanine dyes in combination with the dyes in accordance with this invention as filter dyes in order to prevent irradiation or for other purposes. Furthermore, as spectral sensitizers, known cyanine dyes, merocyanine dyes and hemicyanine dyes may also be used in combination with the dyes in accordance with this invention.

The photographic emulsions used in this invention may further include various surface-active agents for various purposes, for example to aid in coating, prevent static charge, improve slipperiness, aid in emulsification and dispersing, prevent adhesion and improve photographic properties (for example, acceleration of development, increase of contrast, sensitization).

Examples of the surface-active agents are nonionic surface-active agents such as saponin (steroidal), alkylene oxide derivatives (such as polyethylene glycol and polyethylene glycol alkyl ethers), glycidol derivatives, fatty acid esters of polyhydric alcohols and alkyl esters of saccharides; amphoteric surface-active agents such as alkylcarboxylic acid salts, alkylsulfonic acid salts, alkylbenzenesulfonic acid salts and alkylsulfuric acid esters; and cationic surface-active agents such as alkylamine salts, aliphatic or aromatic quaternary ammonium salts, and heterocyclic quaternary ammonium salts such as pyridinium and imidazolium.

In practicing the present invention, known color fading preventing agents, such as hydroquinone derivatives, gallic acid derivatives, p-alkoxyphenols, p-oxyphenol derivatives and bisphenols, may also be used together. Color image stabilizers may be used singly or in combination in this invention.

The photographic emulsion used in this invention may contain an inorganic or organic hardener. Examples are chromium salts (chromium alum, chromium acetate, etc.), aldehydes (formaldehyde, glyoxal, glutaraldehyde, etc.), active vinyl compounds (1,3,5-triacryloyl-hexahydro-s-triazine, 1,3-vinylsulfonyl-2-propanol, etc.), and active halogen compounds (2,4-dichloro-6-hydroxy-s-triazine, etc.). They may be used either singly or in combination.

The photographic material produced in accordance with this invention may contain a color fog inhibitor such as hydroquinone derivatives, aminophenol derivatives, gallic acid derivatives and ascorbic acid derivatives.

The photographic material produced in accordance with this invention may contain an ultraviolet absorber in a hydrophilic colloid layer. Examples of the ultraviolet absorber include benzotriazole compounds substituted by an aryl group, 4-thiazolidone compounds, benzophenone compounds cinnamic acid esters, butadiene compounds, benzoxazole compounds, and ultraviolet absorbing polymers. These ultraviolet absorbers may be immobilized in the hydrophilic colloid layer.

When a dye or ultraviolet absorber is included in a hydrophilic colloid layer in the photographic material produced by utilizing the present invention, it may be mordanted with a cationic polymer or the like.

The various additives described above are specifically described, for example, in Research Disclosure, Vol. 176 (1978, XI) RD-17643.

To the silver halide photographic emulsions used in this invention are added a protective colloid, for example gelatin, acylated gelatins (such as phthalated gelatin and malonated gelatin), cellulose compounds (such as hydroxy ethyl cellulose and carboxy methyl cellulose), soluble starches (such as dextrin), and hydrophilic polymers (such as polyvinyl alcohol, polyvinyl pyrrolidone, polyacrylamide and polystyrenesulfonic acid); plasticizers for dimensional stability; latex polymers; and matt agents. The finished emulsion is coated on a suitable support such as baryta paper, resin-coated paper, synthetic paper-like sheets, a triacetate film, a polyethylene terephthlate film, other plastic bases, or a glass plate.

Exposure for obtaining photographic images may be carried out by ordinary methods. There can be used many known light sources such as natural light (sunlight), a tungsten lamp, a fluorescent lamp, a mercury lamp, a xenon arc lamp, a carbon arc lamp, a xenon flash lamp, and a cathode ray tube flying spot. The exposure time may be 1/1000 second to 1 second used in ordinary cameras, time periods shorter than 1/1000 second, for example $1/10^4$ to $1/10^6$ second with a xenon flash lamp or a cathode ray tube, and time periods longer than 1 second. As required, the spectral composition of the light used for exposure can be adjusted by a color filter. Laser light may also be used for exposure. Exposure may also be effected by light released from a fluorescent body excited by electron beams, X-rays, gamma-rays, alpha-rays, etc.

Known methods and known processing liquors described, for example, in Research Disclosure, Vol. 176, pages 28-30 (RD-17643) may be applied to the photographic processing of the photographic materials produced by utilizing the present invention. The photographic processing may be one for forming a silver image (black-and-white photographic processing) or one for forming a color image (color photographic processing) according to the intended purpose. The processing temperature is usually selected between 18° C. and 50° C., but temperatures lower than 18° C. or higher than 50° C. may also be used.

The following Examples illustrate the present invention more specifically. It should be understood however that the invention is not limited to these examples.

Unless otherwise specified all ratios, percents, etc. are by weight.

EXAMPLE 1

Synthesis of compound 15

135 mg of 3,6-dimethyl-1H-imidazo[1,2-b]pyrazole was dissolved in 1.5 ml of acetic acid, and 1.5 ml of ethyl orthoformate was added. The mixture was heated over a steam bath. The reaction mixture was cooled, and the precipitated yellow crystals were collected by filtration. The crystals were washed with isopropanol and then recrystallized from methanol/isopropanol to give 28 mg of the desired compound.

Melting point: 230°-231° C.
$\lambda_{max}^{methanol}$: 486 nm ($\epsilon = 3.88 \times 10^4$).
Mass spectrum: m/e=280 (M+), 265 (M-CH$_3$)+.

This dye rendered a silver chlorobromide emulsion sensitive to the extent of 575 nm, and the sensitization maximum existed between 465 nm and 530 nm.

The development in Examples 1 to 10 was carried out with the following developer solution (A) at 20° C. for 2 minutes when the emulsion was a silver chlorobromide emulsion; and with the following developer solution (B) at 20° C. for 7 minutes when the emulsion was a silver iodobromide emulsion.

| Developer (A) | |
| --- | --- |
| Metol | 3.1 g |
| Anhydrous sodium sulfite | 45 g |
| Hydroquinone | 12 g |
| Sodium carbonate monohydrate | 79 g |
| Potassium bromide | 1.9 g |
| Water to make | 1 liter |

In use, this developer was diluted with twice its amount of water.

| Developer (B) | |
| --- | --- |
| Metol | 2 g |
| Anhydrous sodium sulfite | 100 g |
| Hydroquinone | 5 g |
| Borax (decahydrate) | 1.97 g |
| Water to make | 1 liter |

EXAMPLE 2

Synthesis of compound 18

150 mg of 2,6-dimethyl-1H-pyrazolo[1,5-b][1,2,4]triazole was dissolved in 1.5 ml of acetic acid, and 1.5 ml of ethyl ortho-formate was added. The mixture was heated over a steam bath. The reaction mixture was cooled, and the precipitated crystals were collected by filtration. The crystals were washed with acetic acid and recrystallized from methanol/chloroform to give 130 mg of the desired compound.

Melting point: more than 300° C.
$\lambda_{max}^{methanol}$: 458 nm ($\epsilon = 4.93 \times 10^4$)
Mass spectrum: m/e=282 (M$^{30}$), 267 (M-CH$_3$)+.

This dye was effective as a sensitizer for increasing the inherent sensitivity portion of a silver chlorobromide emulsion and a silver iodobromide emulsion.

EXAMPLE 3

Synthesis of compound 16

135 ml of 3,6-dimethyl-1H-imidazo[1,2-b]pyrazole was dissolved in 1.5 ml of acetic acid, and 2.0 ml of 1,1,3,3-tetramethoxypropane was added. The mixture was heated over a steam bath. The reaction mixture was cooled, and ether was added to it. The precipitated crystals were collected by filtration and washed with ether. Recrystallization from isopropanol/n-hexane gave 51 mg of the desired compound.

Melting point: 160°-170° C. (decomp.).
$\lambda_{max}^{methanol}$: 522 nm ($\epsilon = 3.45 \times 10^4$).
Mass spectrum: m/e=306 (M+).

This dye was well decolorized by the development with the developers (A) and (B).

EXAMPLE 4

Synthesis of compound 1

135 mg of 3,6-dimethyl-1H-imidazo[1,2-b]pyrazole and 434 mg of 2-(2-acetanilinovinyl)-3-ethylbenzoxazolium iodide were dissolved under heat in 15 ml of ethanol, and after adding 1.5 ml of triethylamine, reacted. After cooling, n-hexane was added to the reaction solution. The precipitated crystals were collected by filtration and recrystallized three times from ethanol to give 222 mg of the desired compound.

Melting point: 295°-300° C. (decomp.).
$\lambda_{max}^{methanol}$: 460 nm ($\epsilon = 4.99 \times 10^4$).
Mass spectrum: m/e=306 (M+).

This dye rendered a silver chlorobromide emulsion sensitive to the extent of 530, and the sensitization maximum was at 490 nm.

EXAMPLE 5

Synthesis of compound 3

By the same method as in Example 4, 185 mg of the desired compound was obtained from 150 mg of 2,6-dimethyl-1H-pyrazolo[1,5-b][1,2,4]triazole and 478 mg of 2-(2-acetanilinovinyl)-3-ethylbenzoxazolium iodide.

Melting point: 280°-290° C. (decomp.).
$\lambda_{max}^{methanol}$: 430 nm ($\epsilon = 5.03 \times 10^4$).
Mass spectrum: m/e=307 (M+).

This dye rendered a silver chlorobromide emulsion sensitive to the extent of 510 nm, and the sensitization maximum was at 480 nm.

EXAMPLE 6

Synthesis of compound 4

By the same method as in Example 4, 220 mg of the desired compound was obtained from 135 mg of 3,6- dimethyl-1H-imidazo[1,2-b]pyrazole and 450 mg of 2-(2-acetanilinovinyl)-3-ethylbenzothiazolium iodide.

Melting point: more than 300° C.

$\lambda_{max}{}^{methanol}$: 494 nm ($\epsilon = 4.95 \times 10^4$).

Mass spectrum: m/e = 322(M+).

This dye rendered a silver chlorobromide emulsion sensitive to the extent of 560 nm, and the sensitization maximum was at 520 nm.

EXAMPLE 7

Synthesis of compound 5

By the same method as in Example 4, 133 mg of the desired compound was obtained from 150 mg of 2,6-dimethyl-1H-pyrazolo[1,5-b][1,2,4]triazole and 496 mg of 2-(2-acetanilinovinyl)-3-ethylbenzothiazolium iodide.

Melting point: 246°–250° C. (decomp.).

$\lambda_{max}{}^{methanol}$: 495 nm ($\epsilon = 9.83 \times 10^4$).

Mass spectrum: m/e = 323 (M+).

This dye spectrally sensitized a silver chlorobromide emulsion to the extent of 560 nm, and the sensitization maximum was at 520 nm. Furthermore, it rendered a silver iodobromide emulsion sensitive to the extent of 540 nm.

EXAMPLE 8

Synthesis of compound 8

By the same method as in Example 4, 171 mg of the desired compound was obtained from 150 mg of 2,6-dimethyl-1H-pyrazolo[1,5-b][1,2,4]triazole and 488 mg of 4-(2-acetanilinovinyl)-1-ethylquinolium iodide.

Melting point: 246°–248° C.

$\lambda_{max}{}^{methanol}$: 562 nm ($\epsilon = 8.04 \times 10^4$).

Mass spectrum: m/e = 317 (M+).

This dye spectrally sensitized a silver chlorobromide emulsion between 500 nm and 590 nm, and the sensitization maximum was at 560–580 nm.

EXAMPLE 9

Synthesis of compound 10

By the same method as in Example 4, 278 mg of the desired compound was obtained from 150 mg of 2,6-dimethyl-1H-pyrazolo[1,5-b][1,2,4]triazole and 473 mg of 2-(4-ethoxy-3-methyl-1,3-butadienyl)-3-ethyl-5,6-dimethylbenzothiazolilium iodide.

Melting point: 270°–275° C. (decomp.).

$\lambda_{max}{}^{methanol}$: 594 nm ($\epsilon = 2.17 \times 10^5$).

Mass spectrum: m/e = 391 (M+).

This dye spectrally sensitized a silver chlorobromide emulsion between 490 nm and 650 nm, and the sensitization maximum was at 520 nm.

EXAMPLE 10

Synthesis of compound 24

A mixture of 100 mg of 3,6-dimethyl-1H-imidazo[1,2-b]pyrazole and 110 mg of 4-dimethylaminobenzaldehyde was dissolved in 10 ml of ethanol, and 0.5 ml of acetic acid was added. The mixture was heated to give a dye having an absorption at $\lambda_{max}{}^{methanol} = 516$ nm. This dye was well decolorized by development with the developers (A) and (B).

While the invention has been described in detail and with reference to specific embodiments thereof, it will be apparent to one skilled in the art that various changes and modifications can be made therein without departing from the spirit and scope thereof.

What is claimed is:

1. A photographic element comprising a support, and at least one silver halide emulsion layer, said photographic element containing at least one layer containing at least one of the dyes represented by the following general formula (I), (II), (III), (IV), (V), (VI), (VII) or (VIII):

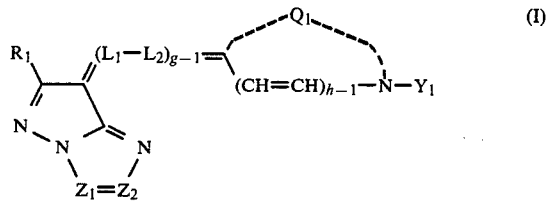

(I)

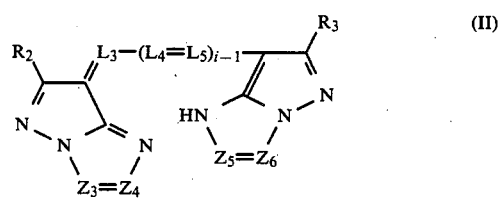

(II)

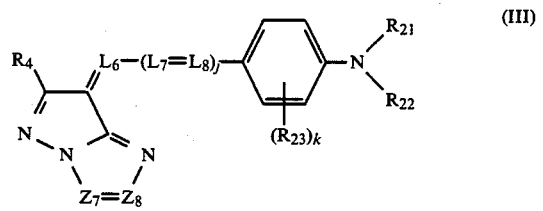

(III)

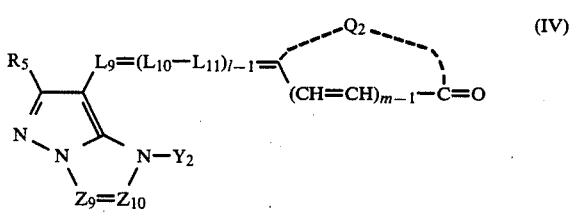

(IV)

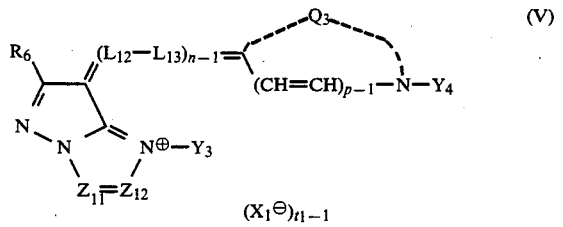

(V)

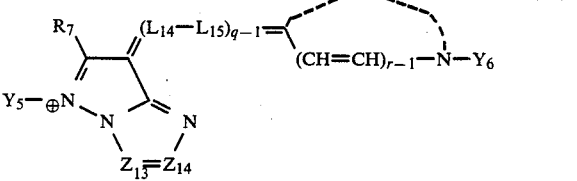

(VI)

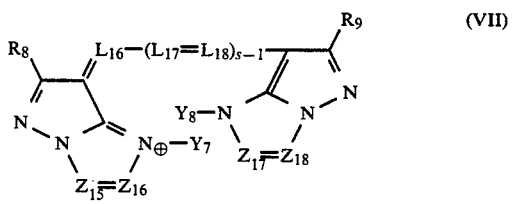

(VII)

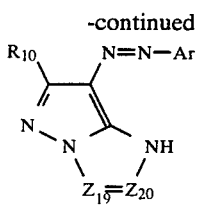

(VIII)

wherein
 $Z_1$ to $Z_{20}$ are identical or different and each represents a nitrogen atom or the group

$Z_1$ to $Z_{20}$ each represents a nitrogen atom or the group $-CR_{24}=$, wherein when $Z_1$, $Z_3$, $Z_6$, $Z_7$, $Z_9$, $Z_{11}$, $Z_{13}$, $Z_{15}$, $Z_{18}$ and $Z_{19}$ represent the group $-CR_{24}=$, $Z_2$, $Z_4$, $Z_5$, $Z_8$, $Z_{10}$, $Z_{12}$, $Z_{14}$, $Z_{16}$, $Z_{17}$ and $Z_{28}$ represents $-CR_{24}=$, respectively, $R_1$ to $R_{10}$ and $R_{24}$ are identical or different, and each represents a hydrogen atom, an alkyl group, an aryl group, a heterocyclic group, an amino group, an acylamino group, an alkoxy group, an alkoxycarbonyl group, a sulfonamide group, an aminocarbonyl group, a hydroxyl group or a carboxyl group, and the alkyl, aryl, heterocyclic, amino, sulfonamide, and aminocarboxyl groups may have one or more substituents, $L_1$ to $L_{18}$ each represent a methine group or a substituted methine group, $Y_1$ and $Y_3$ to $Y_8$ each represent a substituted or unsubstituted alkyl group or a substituted or unsubstituted alkylene group, $Y_2$ represents a hydrogen atom, an alkyl group or a substituted alkyl group, $R_{21}$ and $R_{22}$ each represent a hydrogen atom, an alkyl group, a substituted alkyl group, an aryl group or a substituted aryl group, $R_{23}$ represents a hydrogen atom, a halogen atom, an alkyl group, a substituted alkyl group, an alkoxy group, an aryl group or a substituted aryl group, $Q_1$ to $Q_4$ each represents a nonmetallic atomic grouping required to form a heterocyclic 5- or 6-membered ring tò which an aromatic ring may be fused, $X_1$ to $X_3$ each represents an acid residue,
Ar represents an aromatic ring or a heteroaromatic ring, g, i, j, k, l, n, q and s each represents an integer of 1 to 4, h, m, p and r each represents an integer of 1 or 2, and $t_1$ to $t_3$ each represents an integer of 1 or 2, and when the dye forms an intramolecular salt, $t_1$ to $t_3$ represent 1.

2. The photographic element of claim 1, wherein the substituent $Q_1$, $Q_3$ and $Q_4$ each represents a nometallic atomic grouping required to complete heterocyclic ring used in cyanine dyes, and the substituent $Q_2$ represents an atomic grouping required to complete heterocyclic ring used in merocyanine dyes.

3. The photographic element of claim 1, wherein the substituent $R_1$ to $R_{10}$ each represents a hydrogen atom, alkyl groups having 1 to 33 carbon atoms, substituted alkyl groups having 1 to 33 carbon atoms in the alkyl moiety, aryl groups having 6 to 14 carbon atoms, heterocyclic groups having 5 to 10 carbon atoms, acylamino groups having 1 to 22 carbon atoms, alkoxyl groups having 1 to 22 carbon atoms, sulfonamide groups having 1 to 22 carbon atoms, aminocarbonyl groups having 1 to 22 carbon atoms.

4. The photographic element of claim 1, wherein the substituent $R_{21}$ and $R_{22}$ each represents a hydrogen atom, alkyl groups having 1 to 22 carbon atoms, aryl groups having 6 to 14 carbon atoms.

5. The photographic element of claim 1, wherein the substituent $R_{23}$ represents a hydrogen atom, a halogen atom, alkyl groups having 1 to 22 carbon atoms, alkoxyl groups having 1 to 22 carbon atoms and an atomic group required to complete a cyclic structure together with $R_{21}$ or $R_{22}$.

6. The photographic element of claim 1, wherein the substituent $X_1$, $X_2$ and $X_3$ each represents a halogen ion, a perchlorate ion, a tetrafluoroborate ion, a hexafluorophosphate ion and an alkyl or aryl sulfonate ion.

7. The photographic element of claim 1, wherein the substituent Ar represents a phenyl group, a 2,5-dimethoxyphenyl group, a 4-methoxy phenyl group, a 4-morpholino-2,5-dibutoxy phenyl group, a 4-chlorophenyl group, and a pyridyl group.

8. The photographic element of claim 1, wherein the substituent for the methine group is lower alkyl groups having 1 to 6 carbon atoms, a phenyl group and aralkyl groups having 7 to 12 carbon atoms.

9. The photographic element of claim 1, wherein the substituent $Y_1$ and $Y_3$ to $Y_8$ each represents alkyl groups having 1 to 4 carbon atoms and alkyl groups having 2 to 4 carbon atoms which are substiuted by a sulfo group, a carboxyl group or a hydroxyl group.

10. The photgraphic element of claim 1, wherein the substituent $Y_2$ represents a hydrogen atom and the same groups as the groups for substituent $Y_1$ and $Y_3$ to $Y_8$.

11. The photographic element of claim 1, wherein a combination of ($Z_1$ and $Z_2$), ($Z_3$ and $Z_4$), ($Z_5$ and $Z_6$), ($Z_7$ and $Z_8$), ($Z_9$ and $Z_{10}$), ($Z_{11}$ and $Z_{12}$), ($Z_{13}$ and $Z_{14}$), ($Z_{15}$ and $Z_{16}$), ($Z_{17}$ and $Z_{18}$) or ($Z_{19}$ and $Z_{20}$) is selected from the group consisiting of (1) a combination of

groups, (2) a combination of nitrogen atom and

group and (3) a combination of nitrogen atoms, wherein $R_{24}$ represents the same groups as those represented by $R_1$ to $R_{10}$.

12. The photographic element of claim 1, wherein the dyes of general formulae (I) to (VIII) are used in an amount of $5 \times 10^{-7}$ to $5 \times 10^{-3}$ mole per mole of silver halide in a case that the dyes are added to a silver halide emulsion layer.

13. The photographic element of claim 1, wherein the dyes of general formulae (I) to (VIII) are produced from the 1H-pyrazolo-[1,5-b][1,2,4]triazole or 1H-imidazo[1,2-b]pyrazole.

* * * * *

UNITED STATES PATENT AND TRADEMARK OFFICE
CERTIFICATE OF CORRECTION

PATENT NO. : 4,607,003

DATED : Ausust 19, 1986

INVENTOR(S) : Toshinao Ukai et al

It is certified that error appears in the above-identified patent and that said Letters Patent is hereby corrected as shown below:

In order to correct formula (III) throughout the patent, please substitute the following formula (III) for the formula (III) that appears at: (a) in the Abstract of the Disclosure; (b) in column 1, line 60 to the bottom; and (c) in claim 1, column 26, lines 24 to 31:

--
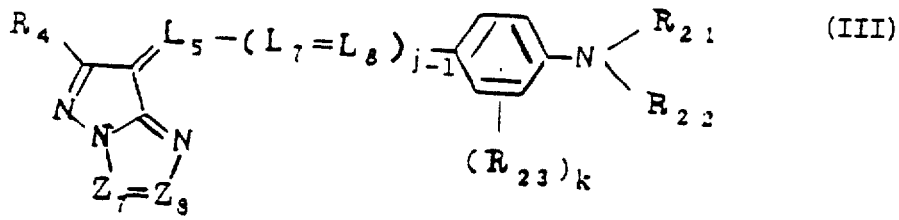
(III)
--

UNITED STATES PATENT AND TRADEMARK OFFICE
CERTIFICATE OF CORRECTION

PATENT NO. : 4,607,003
DATED : August 19, 1986
INVENTOR(S) : Toshinao Ukai et al It is certified that error appears in the above-identified patent and that said Letters Patent is hereby corrected as shown below:

In order to correct formula (VI) throughout the patent, please substitute the following formula (VI) for the formula (VI) that appears at: (a) in the Abstract of the Disclosure; (b) in column 2, lines 20 to 27; and (c) in claim 1, column 26, lines 50 to 57:

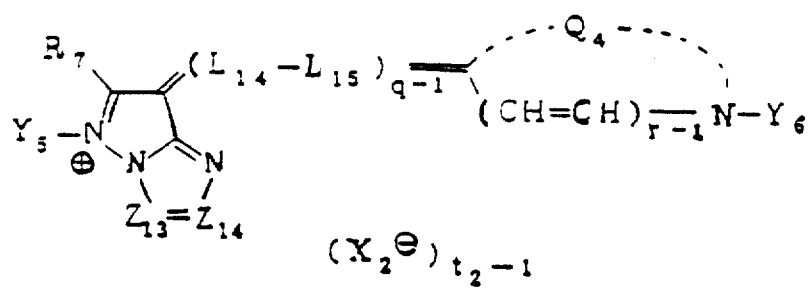

(VI)

Signed and Sealed this

Twenty-first Day of April, 1987

Attest:

DONALD J. QUIGG

*Attesting Officer*     *Commissioner of Patents and Trademarks*